(12) United States Patent
Ito

(10) Patent No.: US 10,124,371 B2
(45) Date of Patent: Nov. 13, 2018

(54) SEPARATION DEVICE AND METHOD FOR MANUFACTURING WATER ABSORPTION MATERIAL

(71) Applicant: DAIKI CO., LTD., Tokyo (JP)

(72) Inventor: Hiroshi Ito, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 15/590,445

(22) Filed: May 9, 2017

(65) Prior Publication Data
US 2017/0239687 A1 Aug. 24, 2017

Related U.S. Application Data

(63) Continuation of application No. PCT/JP2015/067591, filed on Jun. 18, 2015.

(30) Foreign Application Priority Data

Jan. 22, 2015 (JP) .................................. 2015-009945

(51) Int. Cl.
*B07B 15/00* (2006.01)
*B07B 1/24* (2006.01)
(Continued)

(52) U.S. Cl.
CPC ................. *B07B 1/24* (2013.01); *B01J 20/26* (2013.01); *B01J 20/3028* (2013.01);
(Continued)

(58) Field of Classification Search
CPC .. B07B 1/20; B07B 1/24; B07B 1/526; B07B 1/528; B07B 15/00; B02C 23/08;
(Continued)

(56) References Cited

U.S. PATENT DOCUMENTS 3,756,406 A * 9/1973 Khan ........................ B07B 1/24
209/291
3,931,937 A * 1/1976 Hahn .................... B02C 17/002
241/187

(Continued)

FOREIGN PATENT DOCUMENTS

JP S63-209761 A 8/1988
JP H08-117688 A 5/1996
(Continued)

OTHER PUBLICATIONS

Aug. 11, 2015 Written Opinion issued in Patent Application No. PCT/JP2015/067591.
(Continued)

*Primary Examiner* — Joseph C Rodriguez
(74) *Attorney, Agent, or Firm* — Oliff PLC

(57) ABSTRACT

A separation device includes a first shredding unit, a first beating unit, and a first separation unit. The first shredding unit shreds a disposable diaper (processing target) containing a plastic (first material) and a water-absorbent polymer (second material) adhering to the plastic. The first beating unit beats the disposable diaper shredded by the first shredding unit with a first beating member, thereby promoting dissociation of the water-absorbent polymer from the plastic. The first separation unit rotates a first tubular portion in a state in which the disposable diaper beaten by the first beating unit is accommodated therein, thereby separating the water-absorbent polymer passing through first holes from the disposable diaper.

15 Claims, 15 Drawing Sheets

(51) Int. Cl.
*B09B 3/00* (2006.01)
*B09B 5/00* (2006.01)
*B29B 17/04* (2006.01)
*B01J 20/26* (2006.01)
*B01J 20/30* (2006.01)
*B01J 20/32* (2006.01)
*B07B 1/20* (2006.01)
*B03B 9/06* (2006.01)
*B29B 17/02* (2006.01)
*B29L 31/48* (2006.01)

(52) U.S. Cl.
CPC ............ *B01J 20/3268* (2013.01); *B07B 1/20* (2013.01); *B09B 3/00* (2013.01); *B09B 5/00* (2013.01); *B29B 17/04* (2013.01); *B03B 9/061* (2013.01); *B07B 2220/02* (2013.01); *B29B 17/02* (2013.01); *B29B 17/0412* (2013.01); *B29B 2017/0488* (2013.01); *B29L 2031/4878* (2013.01); *Y02W 30/521* (2015.05); *Y02W 30/523* (2015.05); *Y02W 30/622* (2015.05); *Y02W 30/625* (2015.05)

(58) Field of Classification Search
CPC . B02C 23/10; B02C 23/16; B29L 2031/4878; B01J 20/3028; Y02W 30/521; Y02W 30/622; Y02W 30/625
See application file for complete search history.

(56) References Cited

U.S. PATENT DOCUMENTS

| | | | | |
|---|---|---|---|---|
| 3,973,735 A * | 8/1976 | Ito | ...................... | B02C 17/002 241/163 |
| 4,664,320 A * | 5/1987 | Steffens | ................. | D21B 1/026 241/188.1 |
| 4,760,717 A * | 8/1988 | Ponzielli | .................. | B03B 5/00 162/243 |
| 5,292,075 A * | 3/1994 | Bartlett | ................... | B03B 9/061 241/20 |
| 5,429,311 A * | 7/1995 | Cina | ....................... | B03B 9/061 241/14 |
| 5,437,418 A * | 8/1995 | Graef | ................ | A61F 13/15707 241/152.2 |
| 5,558,745 A * | 9/1996 | Conway | .................. | B29B 17/02 134/26 |
| 5,570,790 A * | 11/1996 | Rumpf | ..................... | B07B 1/20 209/291 |
| 5,618,003 A * | 4/1997 | Akiyoshi | .................. | A61L 2/07 241/19 |
| 5,740,918 A * | 4/1998 | Hayashi | ................ | B02C 13/282 209/173 |
| 6,206,199 B1 * | 3/2001 | Kurtz | ........................ | B02C 7/06 209/11 |
| 6,629,653 B2 * | 10/2003 | Fahrbach | ................ | B02C 13/13 209/300 |
| 7,097,044 B2 * | 8/2006 | Gutierrez | .................. | B03B 5/32 209/305 |
| 8,436,058 B2 * | 5/2013 | Grimes | ................... | B29B 17/02 209/245 |
| 8,827,545 B2 * | 9/2014 | Kalidindi | ................ | B01F 9/005 209/296 |
| 9,308,673 B2 * | 4/2016 | Feng | .................... | B24B 27/033 |
| 9,393,546 B2 * | 7/2016 | Ito | .......................... | B03B 9/061 |
| 9,469,050 B2 * | 10/2016 | Ito | ........................... | B29B 17/02 |
| 9,814,628 B2 * | 11/2017 | Hayashi | ............ | A61F 13/15617 |
| 2005/0167537 A1 * | 8/2005 | Chen | ................... | A47J 43/0711 241/292.1 |
| 2016/0001296 A1 * | 1/2016 | Scaife | .................... | B02C 13/06 241/24.1 |
| 2017/0239847 A1 * | 8/2017 | Ito | .......................... | B29B 17/02 |

FOREIGN PATENT DOCUMENTS

| | | |
|---|---|---|
| JP | H10-191864 A | 7/1998 |
| JP | 2002-143702 A | 5/2002 |
| JP | 2002-177888 A | 6/2002 |
| JP | 3118406 U | 1/2006 |
| JP | 2006-212376 A | 8/2006 |
| JP | 2008-93513 A | 4/2008 |
| JP | 2008-302270 A | 12/2008 |
| JP | 2012-106162 A | 6/2012 |
| JP | 2012-106185 A | 6/2012 |
| JP | 2014-091082 A | 5/2014 |
| WO | 2014/125613 A1 | 8/2014 |
| WO | 2014/181469 A1 | 11/2014 |

OTHER PUBLICATIONS

Aug. 11, 2015 International Search Report issued in Patent Application No. PCT/JP2015/067591.
May 30, 2017 Office Action issued in Japanese Patent Application No. 2015-009945.

* cited by examiner

SEPARATION DEVICE AND METHOD FOR MANUFACTURING WATER ABSORPTION MATERIAL

CROSS REFERENCE TO RELATED APPLICATION

This is a Continuation of International Application No. PCT/JP2015/067591 filed Jun. 18, 2015, which claims the benefit of Japanese Application No. 2015-009945 filed Jan. 22, 2015. The contents of these applications are hereby incorporated by reference in their entirety.

TECHNICAL FIELD

The present invention relates to a separation device and a method for manufacturing a water absorption material using the separation device.

BACKGROUND ART

An example of conventional separation devices is disclosed in Patent Document 1. In the separation device disclosed in this document, first, a defective disposable diaper or the like in which a water-absorbent member is filled in an exterior material is cut into pieces of a predetermined size by a cutter. Then, the cut pieces are fed into a separator by pneumatic conveyance.

The separator has a rotational shaft that is provided so as to be rotatable about its axis and a cylindrical mesh unit that surrounds the rotational shaft and that is provided so as to be rotatable concentrically with the rotational shaft in an opposite direction. The rotational shaft is provided with a plurality of stirring rods that are disposed radially. The cut pieces that are fed into this separator are divided into the exterior material and the water-absorbent member by the rotational axis and the cylindrical mesh unit rotating in mutually opposite directions. The water-absorbent member is sifted out by meshes of the cylindrical mesh unit.

CITATION LIST

Patent Documents

Patent Document 1; JP H8-117688A

SUMMARY OF INVENTION

Technical Problem

As described above, according to this separation device, a water-absorbent resin or the like can be separated from a defective disposable diaper or the like. However, conventional separation devices have room for improvement in terms of separation efficiency.

Solution to Problem

The present invention was made in view of the above-described problems, and it is an object thereof to provide a separation device having high separation efficiency and a method for manufacturing a water absorption material using the separation device.

A separation device according to the present invention includes a first shredding unit that shreds a processing target containing a first material and a second material adhering to the first material; a first beating unit that has a first beating member with which the processing target shredded by the first shredding unit is beaten, and that promotes dissociation of the second material from the first material by beating the processing target with the first beating member; and a first separation unit that has a first tubular portion in which a large number of first holes that allow the second material contained in the processing target beaten by the first beating unit to pass through without allowing the first material to pass through are formed, and that separates the second material passing through the first holes from the processing target by rotating the first tubular portion in a state in which the processing target beaten by the first beating unit is accommodated in the first tubular portion.

In this separation device, the processing target containing the first material and the second material adhering to the first material is shredded by the first shredding unit. The processing target shredded by the first shredding unit is transferred to the first beating unit. In the first beating unit, the processing target is beaten by the first beating member. The processing target beaten by the first beating unit is transferred to the first separation unit. In the first separation unit, the first tubular portion is rotated, and thus the second material dissociated from the first material is discharged to the outside of the first tubular portion through the first holes. As a result, the second material is separated from the processing target.

In this manner, in the separation device according to the present invention, beating by the first beating unit is performed prior to separation by the first separation unit. The beating promotes the dissociation of the second material from the first material. Thus, in the first separation unit, the second material is easily separated from the processing target, and therefore the separation efficiency is improved. Here, the separation efficiency refers to the ratio of the weight of the second material that is separated from the processing target to the weight of the second material that is contained in the processing target immediately before the processing.

Advantageous Effects of Invention

According to the present invention, a separation device having high separation efficiency and a method for manufacturing a water absorption material using the separation device are realized.

DESCRIPTION OF EMBODIMENTS

Figure 1:
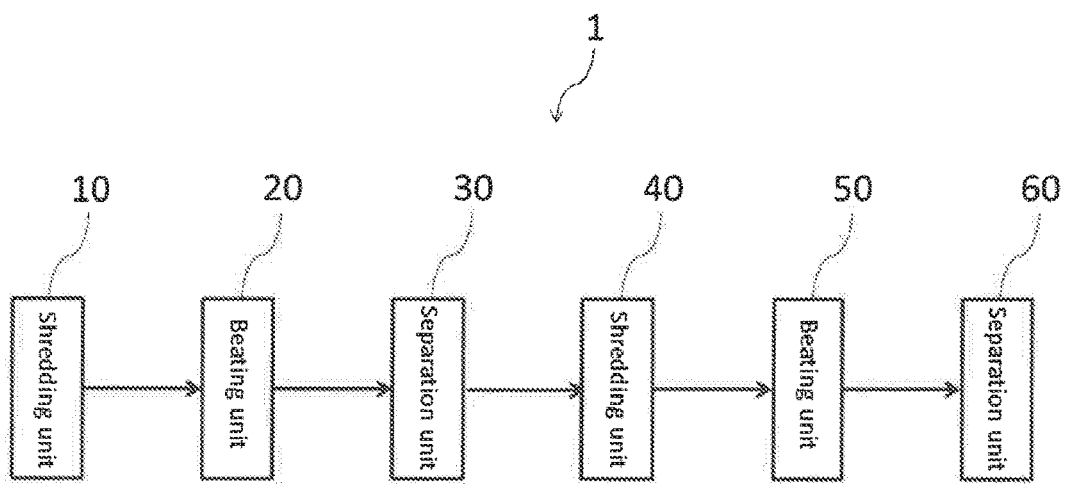
FIG. 1 is a configuration diagram showing an embodiment of a separation device according to the present invention.

Hereinafter, embodiments of the present invention will be described in detail with reference to the drawings. It should be noted that the description of the drawings denotes like elements by like reference numerals and omits redundant descriptions.

FIG. 1 is a configuration diagram showing an embodiment of a separation device according to the present invention. A separation device 1 processes a processing target containing a first material and a second material adhering to the first material, thereby dissociating the second material from the first material and separating the second material from the processing target. The processing target may be a hygiene product deemed as being defective. Examples of the hygiene product include a disposable diaper, a sanitary napkin, and a urine absorbing pad. The present embodiment will be described using a case where the processing target is a disposable diaper, the first material is a plastic, and the second material is a water-absorbent polymer (including a highly water-absorbent polymer) as an example.

The separation device 1 includes a shredding unit 10 (first shredding unit), a beating unit 20 (first beating unit), a separation unit 30 (first separation unit), a shredding unit 40 (second shredding unit), a beating unit 50 (second beating unit), and a separation unit 60 (second separation unit).

The shredding unit 10 shreds a disposable diaper containing a plastic and a water-absorbent polymer adhering to the plastic into fragments. For example, a crusher or a grinder can be used as the shredding unit 10. A screen is provided in the shredding unit 10. The hole diameter of the screen may be between 50 mm and 100 mm inclusive, for example.

Figure 2:
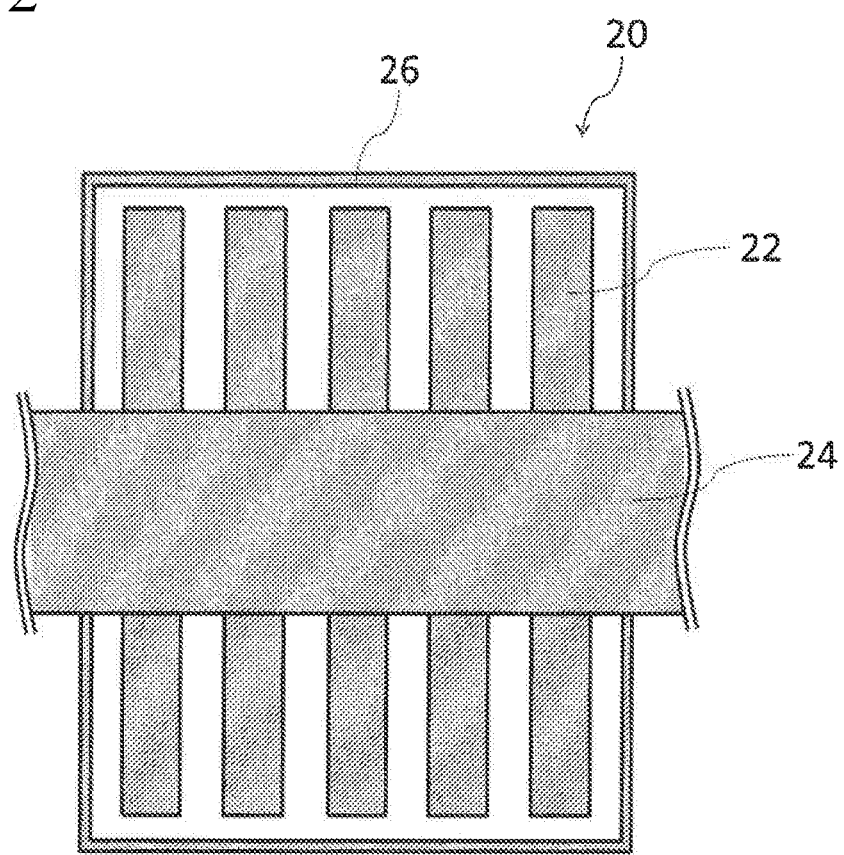
FIG. 2 is a cross-sectional view showing a beating unit 20 of the separation device in FIG. 1.
Figure 3:
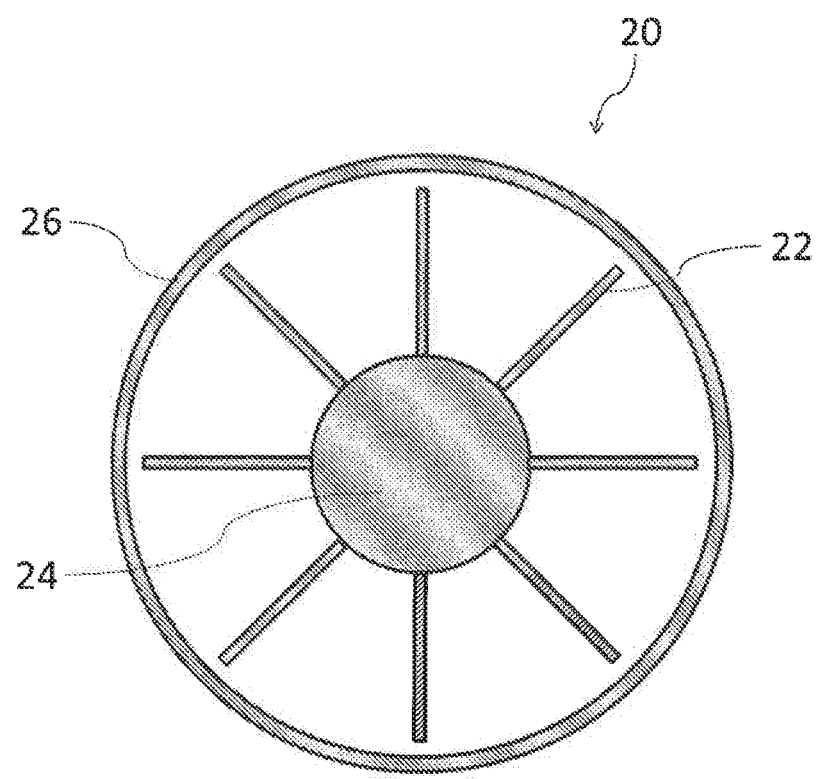
FIG. 3 is a cross-sectional view showing the beating unit 20 of the separation device in FIG. 1.

The structure of the beating unit 20 will be described with reference to FIGS. 2 and 3. The beating unit 20 has a beating member 22 (first beating member), a rotational shaft 24 (first rotational shaft), and a housing 26 (first housing). The beating member 22 beats the disposable diaper fragments shredded by the shredding unit 10. Specifically, the beating member 22 has a plate-like shape and beats the disposable diaper fragments with its plate surface.

The rotational shaft 24 has a substantially cylindrical shape and is provided so as to be rotatable about its central axis. The central axis of the rotational shaft 24 extends horizontally. FIGS. 2 and 3 show cross sections that are parallel and perpendicular, respectively, to the central axis. The above-described beating member 22 is attached to the circumference of the rotational shaft 24. In the present embodiment, a plurality of beating members 22 are provided. As can be seen from FIG. 2, the beating members 22 are provided at a plurality of positions (five positions in the present embodiment) along the central axis of the rotational shaft 24. Moreover, as can be seen from FIG. 3, at each of those positions, a plurality of (eight, in the present embodiment) beating members 22 are radially attached to the circumference of the rotational shaft 24. Each beating member 22 is disposed with its thickness direction extending orthogonally to the central axis. The outer diameter of the rotational shaft 24 may be between 15 cm and 25 cm inclusive, for example.

The housing 26 has a substantially cylindrical tubular shape and is provided so as to enclose the beating members 22 and the rotational shaft 24. The central axis of the housing 26 coincides with the central axis of rotational shaft 24. The housing 26 is configured to accommodate the disposable diaper fragments shredded by the shredding unit 10. The inner diameter of the housing 26 may be between 30 cm and 50 cm inclusive, for example. Moreover, the distance from an inner circumferential surface of the housing 26 to a leading end of each beating member 22 may be between 10 mm and 30 mm inclusive, for example.

The beating unit 20 beats the disposable diaper fragments with the beating members 22, thereby promoting dissociation of the water-absorbent polymer from the plastic. More specifically, in a state in which the disposable diaper fragments shredded by the shredding unit 10 are accommodated in the housing 26, the rotational shaft 24 is rotated. Then, the beating members 22 rotating together with the rotational shaft 24 repeatedly beat the disposable diaper fragments, and the hitting force and the like generated by the beating promote dissociation of the water-absorbent polymer from the plastic. At this time, a portion of the water-absorbent polymer is completely dissociated from the plastic. The water-absorbent polymer that has been separated from the disposable diaper in this manner is discharged to the outside of the beating unit 20 by a discharging means, which is not shown.

Figure 4:
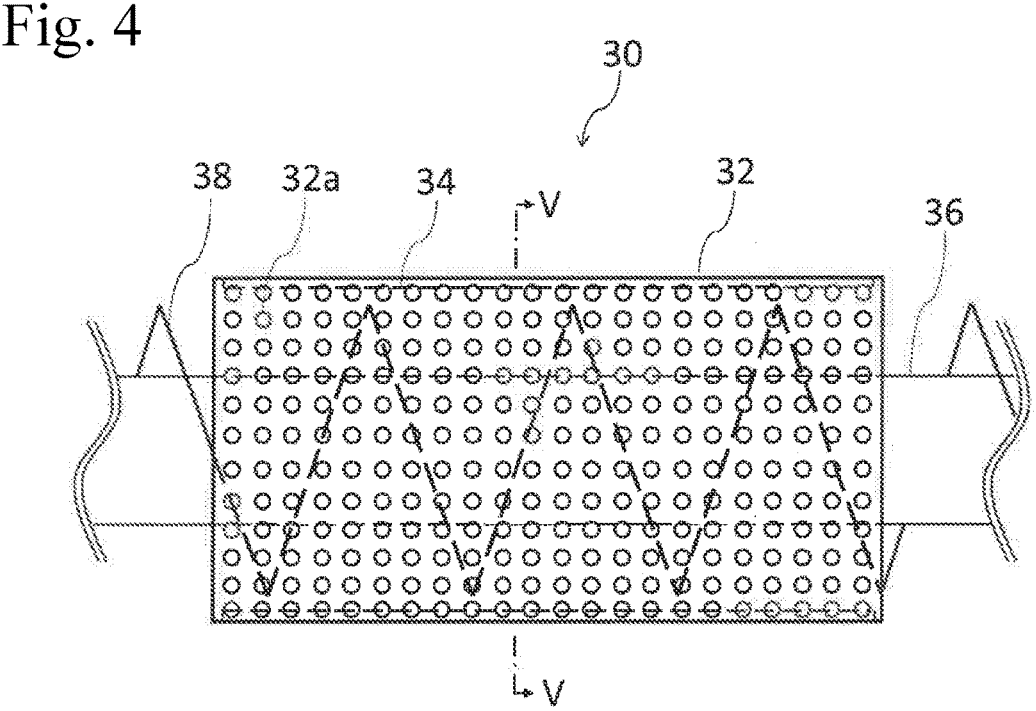
FIG. 4 is a side view showing a separation unit 30 of the separation device in FIG. 1.
Figure 5:
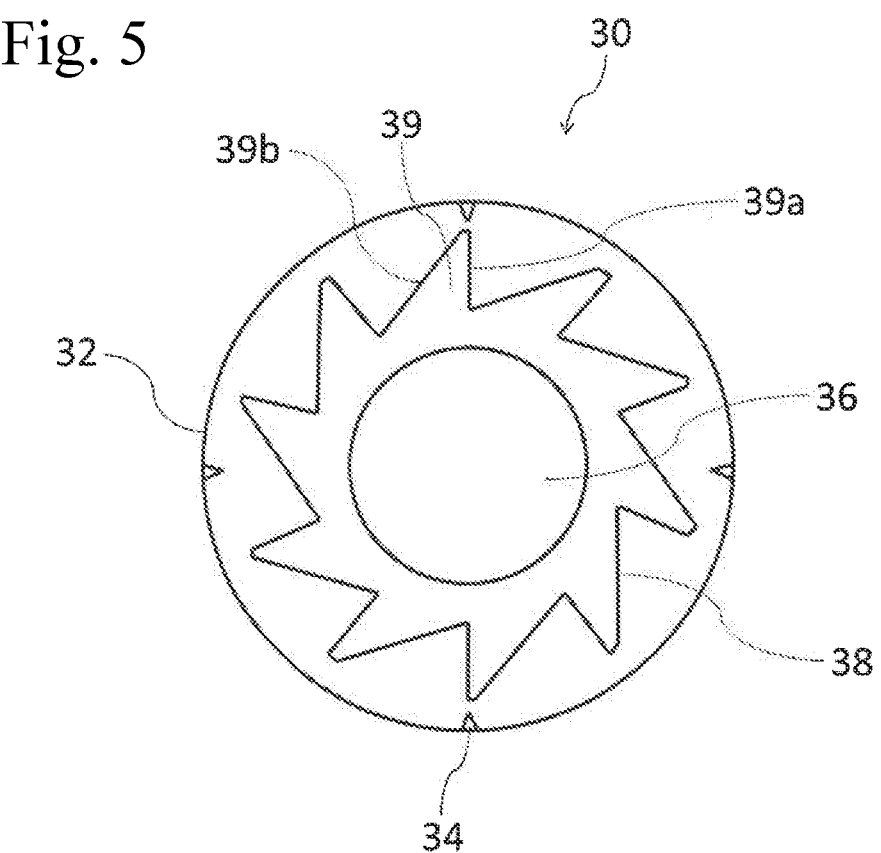
FIG. 5 is a diagram for explaining the structure of a cross section taken along line V-V in FIG. 4.

The structure of the separation unit 30 will be described with reference to FIGS. 4 and 5. FIG. 4 is a side view showing the separation unit 30. FIG. 5 is a diagram for explaining the structure of a cross section taken along line V-V in FIG. 4. The separation unit 30 has a drum 32 (first tubular portion). The drum 32 has a substantially cylindrical tubular shape and is provided so as to be rotatable about its central axis. The central axis of the drum 32 extends horizontally. The inner diameter of the drum 32 may be between 30 cm and 50 cm inclusive, for example.

A large number of holes 32a (first holes) are formed in the drum 32. The holes 32a are formed over substantially the entire drum 32. The holes 32a do not allow the plastic contained in the disposable diaper fragments beaten by the beating unit 20 to pass through, but allow the water-absorbent polymer to pass through. The diameter of the holes 32a may be between 10 mm and 30 mm inclusive, for example. The separation unit 30 rotates the drum 32 in a state in which the disposable diaper fragments beaten by the beating unit 20 are accommodated therein, thereby separating the water-absorbent polymer passing through the holes 32a from the disposable diaper fragments.

A ridge 34 (first ridge) is formed on an inner circumferential surface of the drum 32. The ridge 34 extends in a direction in which the central axis of the drum 32 extends. The ridge 34 extends over substantially the entire path from an inlet side (left side of FIG. 4) to an outlet side (right side of FIG. 4) of the drum 32. Also, the ridge 34 has a substantially triangular cross-sectional shape. The height of the ridge 34 (length in a radial direction of the drum 32) may be between 5 mm and 20 mm inclusive, for example. Preferably, "p" (p: an integer between 3 and 5 inclusive) ridges 34 are provided. The "p" ridges 34 are arranged on the inner circumferential surface of the drum 32 at regular intervals. That is to say, in a cross section (cross section shown in FIG. 5) that is perpendicular to the central axis of the drum 32, an angle α that is formed by a line connecting one ridge 34 to the central axis and a line connecting the next ridge 34 to the central axis is substantially equal to 360°/p. In the present embodiment, p=4 and α=90°.

A rotating rod 36 and a screw member 38 are provided inside the drum 32. The rotating rod 36 has a substantially cylindrical shape and is provided so as to be rotatable about its central axis. The central axis of the rotating rod 36 coincides with the central axis of the drum 32. However, the rotating rod 36 rotates independently of the drum 32. The outer diameter of the rotating rod 36 may be between 15 cm and 25 cm inclusive, for example.

The screw member 38 is helically provided around the rotating rod 36. The screw member 38 is fixed to the rotating rod 36 and rotates together with the rotating rod 36. A plurality of teeth 39 are formed in the screw member 38. An end portion of each tooth 39 is constituted by a side 39a and a side 39b in a front view (see FIG. 5).

The side 39a extends in the radial direction of the drum 32 and the rotating rod 36. An inner end (end that is closer to the rotating rod 36) of the side 39a is located at a position spaced apart from the rotating rod 36. Similarly, an outer end (end that is closer to the drum 32) of the side 39a is located at a position spaced apart from the drum 32. The distance from the outer end of the side 39a to the inner circumferential surface of the drum 32 may be between 10 mm and 30 mm inclusive, for example. However, this distance is set to be larger than the height of the ridges 34. The side 39b connects the outer end of the side 39a to the inner end of the side 39a of the next tooth 39. The side 39b is longer than the side 39a. The ratio of the length of the side 39b to the length of the side 39a may be between 2 and 2.5 inclusive, for example.

The rotating rod 36 and the screw member 38 rotate in a left-handed direction (counterclockwise) in FIG. 5. That is to say, in each tooth 39, the side 39b is located on a forward side with respect to the rotation direction, and the side 39a is located on a rearward side with respect to the rotation direction. The rotation direction of the drum 32 described above may be the same as the rotation direction of the rotating rod 36 and the screw member 38 or may be opposite to this rotation direction. In the case where these rotation directions are the same, it is preferable that the rotation speed of the rotating rod 36 and the screw member 38 is greater than the rotation speed of the drum 32.

The shredding unit 40 shreds the disposable diaper fragments from which the water-absorbent polymer passing through the holes 32a has been separated by the separation unit 30. For example, a crusher or a grinder can be used as the shredding unit 40. A screen is provided in the shredding unit 40. The hole diameter of the screen may be between 10 mm and 50 mm inclusive, for example.

Figure 6:
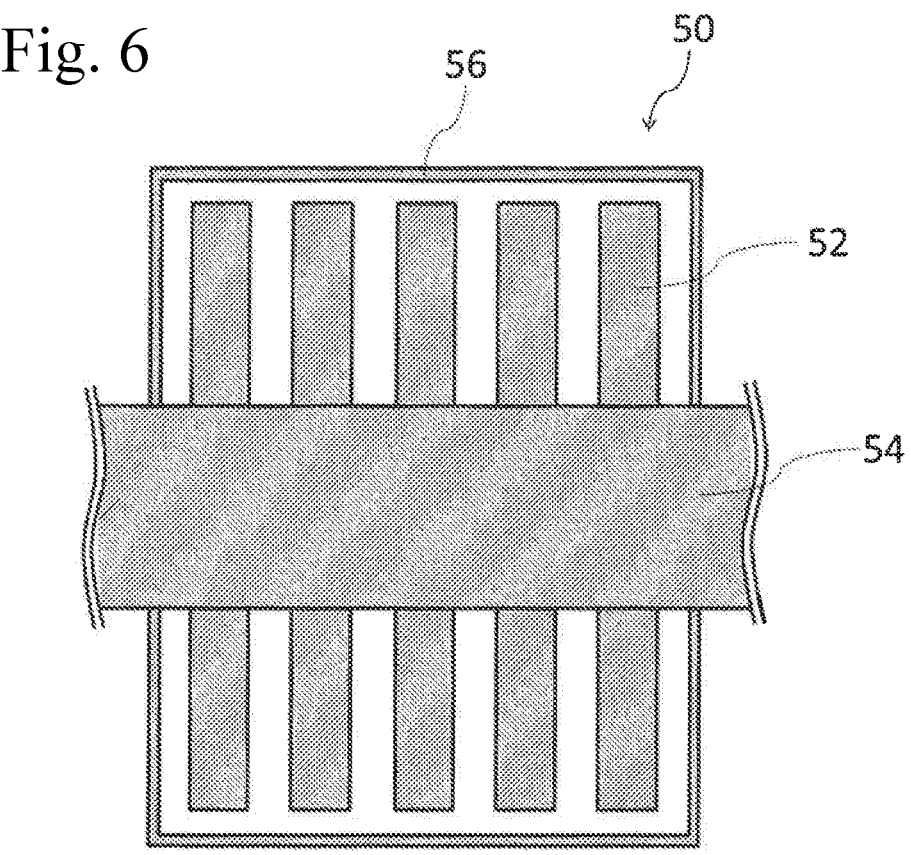
FIG. 6 is a cross-sectional view showing a beating unit 50 of the separation device in FIG. 1.
Figure 7:
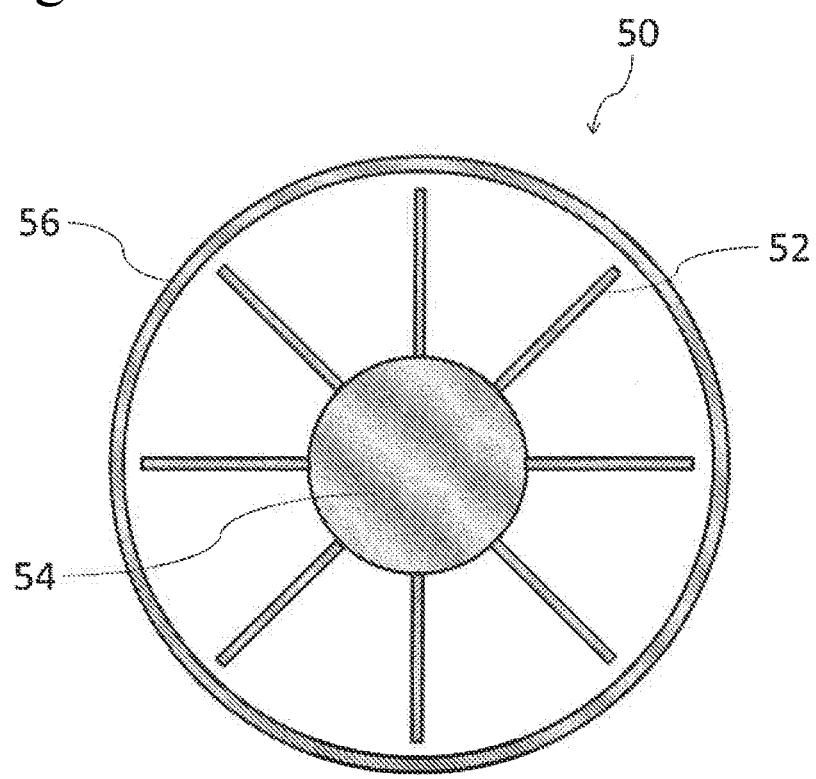
FIG. 7 is a cross-sectional view showing the beating unit 50 of the separation device in FIG. 1.

The structure of the beating unit 50 will be described with reference to FIGS. 6 and 7. The beating unit 50 has a beating member 52 (second beating member), a rotational shaft 54 (second rotational shaft), and a housing 56 (second housing). The beating member 52 beats the disposable diaper fragments shredded by the shredding unit 40. Specifically, the beating member 52 has a plate-like shape and beats the disposable diaper fragments with its plate surface.

The rotational shaft 54 has a substantially cylindrical shape and is provided so as to be rotatable about its central axis. The central axis of the rotational shaft 54 extends horizontally. FIGS. 6 and 7 show cross sections that are parallel and perpendicular, respectively, to the central axis. The above-described beating member 52 is attached to the circumference of the rotational shaft 54. In the present embodiment, a plurality of beating members 52 are provided. As can be seen from FIG. 6, the beating members 52 are provided at a plurality of positions (five positions in the present embodiment) along the central axis of the rotational shaft 54. Moreover, as can be seen from FIG. 7, at each of those positions, a plurality of (eight, in the present embodiment) beating members 52 are radially attached to the circumference of the rotational shaft 54. Each beating member 52 is disposed with its thickness direction extending orthogonally to the central axis. The outer diameter of the rotational shaft 54 may be between 15 cm and 25 cm inclusive, for example.

The housing 56 has a substantially cylindrical tubular shape and is provided so as to enclose the beating members 52 and the rotational shaft 54. The central axis of the housing 56 coincides with the central axis of rotational shaft 54. The disposable diaper fragments shredded by the shredding unit 40 are accommodated in the housing 56. The inner diameter of the housing 56 may be between 30 cm and 50 cm inclusive, for example. Moreover, the distance from an inner circumferential surface of the housing 56 to a leading end of each beating member 52 is smaller than the above-described distance from the inner circumferential surface of the housing 26 to the leading end of each beating member 22, and may be between 5 mm and 15 mm inclusive, for example.

The beating unit 50 beats the disposable diaper fragments with the beating members 52, thereby promoting dissociation of the water-absorbent polymer from the plastic. More specifically, in a state in which the disposable diaper fragments shredded by the shredding unit 40 are accommodated in the housing 56, the rotational shaft 54 is rotated. Then, the beating members 52 rotating together with the rotational shaft 54 repeatedly beat the disposable diaper fragments, and the hitting force and the like generated by the beating promote dissociation of the water-absorbent polymer from the plastic. At this time, a portion of the water-absorbent polymer is completely dissociated from the plastic. The water-absorbent polymer that has been separated from the disposable diaper in this manner is discharged to the outside of the beating unit 50 by a discharging means, which is not shown.

Figure 8:
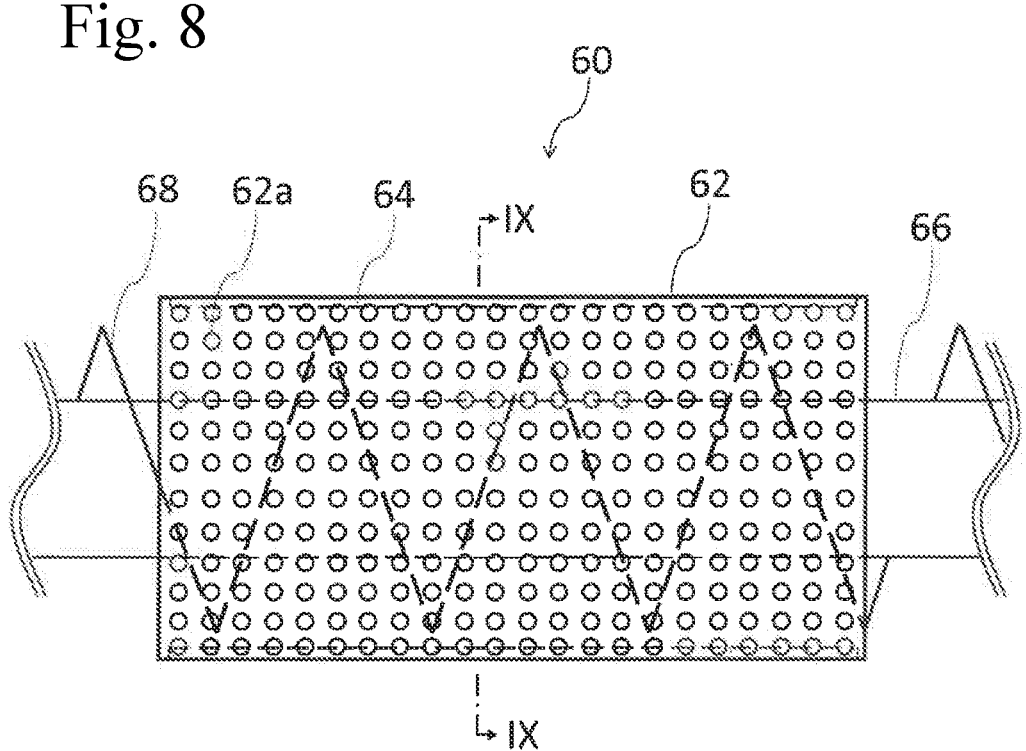
FIG. 8 is a side view showing a separation unit 60 of the separation device in FIG. 1.
Figure 9:
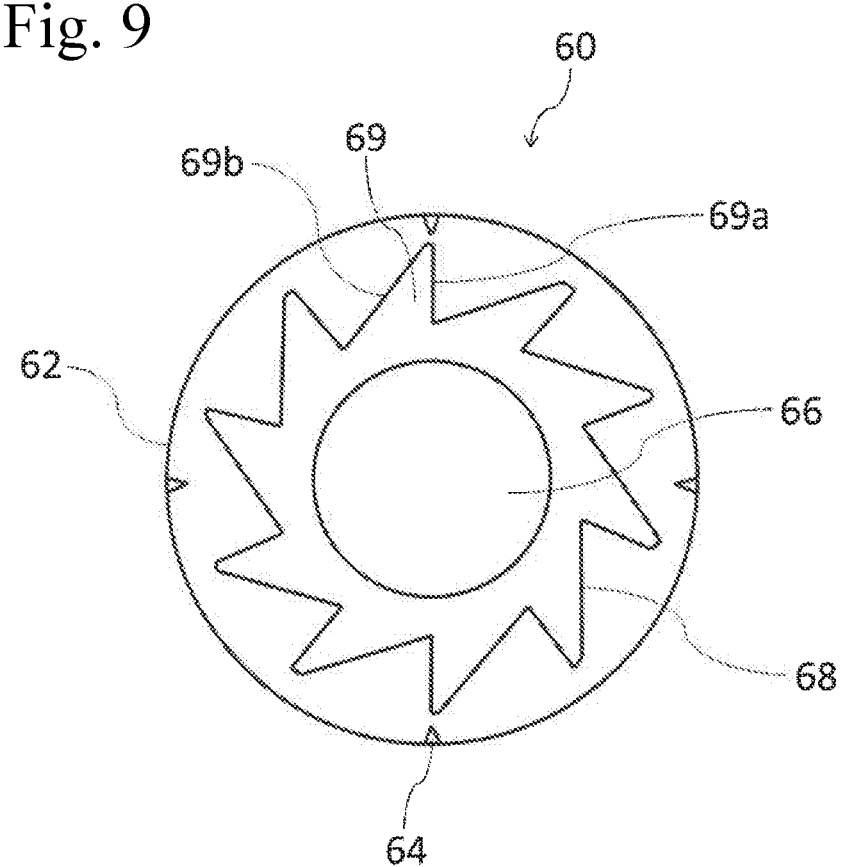
FIG. 9 is a diagram for explaining the structure of a cross section taken along line IX-IX in FIG. 8.

The structure of the separation unit 60 will be described with reference to FIGS. 8 and 9. FIG. 8 is a side view showing the separation unit 60. FIG. 9 is a diagram for explaining the structure of a cross section taken along line IX-IX in FIG. 8. The separation unit 60 has a drum 62 (second tubular portion). The drum 62 has a substantially cylindrical tubular shape and is provided so as to be rotatable about its central axis. The central axis of the drum 62 extends horizontally. The inner diameter of the drum 62 may be between 30 cm and 50 cm inclusive, for example.

A large number of holes 62a (second holes) are formed in the drum 62. The holes 62a are formed over substantially the entire drum 62. The holes 62a do not allow the plastic contained in the disposable diaper fragments beaten by the beating unit 50 to pass through, but allow the water-absorbent polymer to pass through. The diameter of the holes 62a may be between 5 mm and 10 mm inclusive, for example. The separation unit 60 rotates the drum 62 in a state in which the disposable diaper fragments beaten by the beating unit 50 are accommodated therein, thereby separating the water-absorbent polymer passing through the holes 62a from the disposable diaper fragments.

A ridge 64 (second ridge) is formed on an inner circumferential surface of the drum 62. The ridge 64 extends in a direction in which the central axis of the drum 62 extends.

The ridge 64 extends over substantially the entire path from an inlet side (left side of FIG. 8) to an outlet side (right side of FIG. 8) of the drum 62. Also, the ridge 64 has a substantially triangular cross-sectional shape. The height (length in the radial direction of the drum 62) of the ridge 64 is smaller than the height of the above-described ridges 34 and may be between 3 mm and 10 mm inclusive, for example. Preferably, "q" (q: an integer between 3 and 5 inclusive) ridges 64 are provided. The "q" ridges 64 are arranged on the inner circumferential surface of the drum 62 at regular intervals. That is so say, in a cross section (cross section shown in FIG. 9) that is perpendicular to the central axis of the drum 62, an angle β that is formed by a line connecting one ridge 64 to the central axis and a line connecting the next ridge 64 to the central axis is substantially equal to 360°/q. In the present embodiment, q=4 and β=90°.

A rotating rod 66 and a screw member 68 are provided inside the drum 62. The rotating rod 66 has a substantially cylindrical shape and is provided so as to be rotatable about its central axis. The central axis of the rotating rod 66 coincides with the central axis of the drum 62. However, the rotating rod 66 rotates independently of the drum 62. The outer diameter of the rotating rod 66 may be between 15 cm and 25 cm inclusive, for example.

The screw member 68 is helically provided around the rotating rod 66. The screw member 68 is fixed to the rotating rod 66 and rotates together with the rotating rod 66. A plurality of teeth 69 are formed in the screw member 68. An end portion of each tooth 69 is constituted by a side 69a and a side 69b in a front view (see FIG. 9).

The side 69a extends in the radial direction of the drum 62 and the rotating rod 66. An inner end (end that is closer to the rotating rod 66) of the side 69a is located at a position spaced apart from the rotating rod 66. Similarly, an outer end (end that is closer to the drum 62) of the side 69a is located at a position spaced apart from the drum 62. The distance from the outer end of the side 69a to the inner circumferential surface of the drum 62 is smaller than the above-described distance from the outer end of the side 39a to the inner circumferential surface of the drum 32 and may be between 5 mm and 15 mm inclusive, for example. However, the distance from the outer end of the side 69a to the inner circumferential surface of the drum 62 is set to be larger than the height of the ridges 64. The side 69b connects the outer end of the side 69a to the inner end of the side 69a of the next tooth 69. The side 69b is longer than the side 69a. The ratio of the length of the side 69b to the length of the side 69a may be between 2 and 2.5 inclusive, for example.

The rotating rod 66 and the screw member 68 rotate in a left-handed direction (counterclockwise) in FIG. 9. That is to say, in each tooth 69, the side 69b is located on the forward side with respect to the rotation direction, and the side 69a is located on the rearward side with respect to the rotation direction. The rotation direction of the drum 62 described above may be the same as the rotation direction of the rotating rod 66 and the screw member 68 or may be opposite to this rotation direction. In the case where these rotation directions are the same, it is preferable that the rotation speed of the rotating rod 66 and the screw member 68 is greater than the rotation speed of the drum 62.

Next, the operation of the separation device 1 will be described. A disposable diaper, which is a processing target, is first shredded by the shredding unit 10 into fragments. The disposable diaper fragments shredded by the shredding unit 10 are transferred to the beating unit 20. For example, a belt conveyor or a screw conveyor can be used for the transfer.

The disposable diaper fragments transferred to the beating unit 20 are accommodated in the housing 26 and, in this state, beaten by the beating members 22 rotating together with the rotational shaft 24. Thus, dissociation of the water-absorbent polymer from the plastic is promoted.

The disposable diaper fragments beaten by the beating unit 20 are transferred to the separation unit 30. The disposable diaper fragments transferred to the separation unit 30 are propelled from the inlet side (left side of FIG. 4) to the outlet side (right side of FIG. 4) of the drum 32 by the rotating screw member 38. Meanwhile, due to the centrifugal force and the like generated by the rotation of the drum 32, the water-absorbent polymer dissociated from the plastic is discharged to the outside of the drum 32 through the holes 32a. Thus, a portion of the water-absorbent polymer is separated from the disposable diaper fragments. It should be noted that in the case where the processing target is a disposable diaper as in the present embodiment, fluff pulp is also separated together with the water-absorbent polymer.

The disposable diaper fragments after separation by the separation unit 30 are transferred to the shredding unit 40 and are further shredded. The disposable diaper fragments shredded by the shredding unit 40 are transferred to the beating unit 50. The disposable diaper fragments transferred to the beating unit 50 are accommodated in the housing 56 and, in this state, beaten by the beating members 52 rotating together with the rotational shaft 54. Thus, dissociation of the water-absorbent polymer from the plastic is promoted.

The disposable diaper fragments beaten by the beating unit 50 are transferred to the separation unit 60. The disposable diaper fragments transferred to the separation unit 60 are propelled from the inlet side (left side of FIG. 8) to the outlet side (right side of FIG. 8) of the drum 62 by the rotating screw member 68. Meanwhile, due to the centrifugal force and the like generated by the rotation of the drum 62, the water-absorbent polymer dissociated from the plastic is discharged to the outside of the drum 62 through the holes 62a. Thus, the remaining water-absorbent polymer is separated from the disposable diaper fragments.

Figure 10:
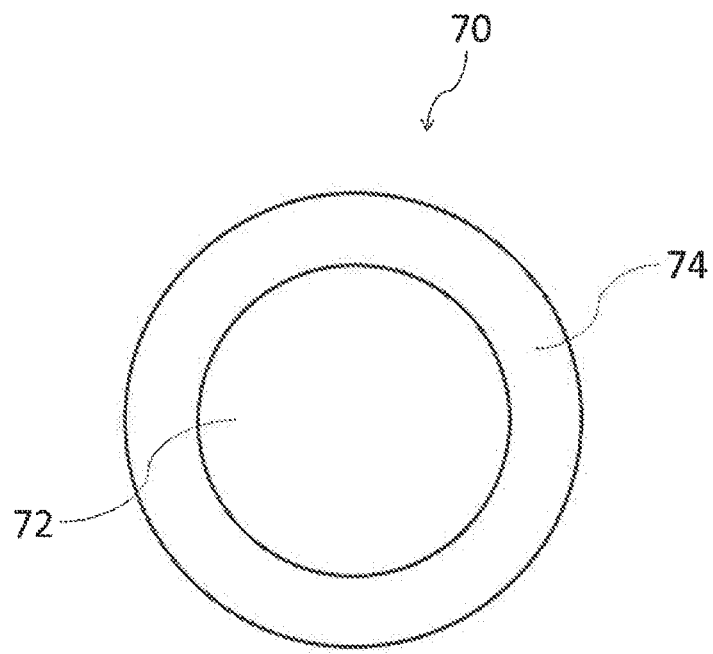
FIG. 10 schematically shows an embodiment of a water absorption material according to the present invention.

FIG. 10 schematically shows an embodiment of a water absorption material according to the present invention. A water absorption material 70 is a water absorption material that absorbs a liquid, and includes a granular core portion 72 (granulated matter) and a coating layer portion 74. The water absorption material 70 may be, for example, an excrement disposal material for pets such as cats and dogs.

The granular core portion 72 is formed to be granular in form. Examples of the shape of the granular core portion 72 include a sphere, an ellipse, and a cylinder. The granular core portion 72 has the function of absorbing and retaining a liquid such as urine. The plastic obtained from a disposable diaper using the above-described separation device 1 (i.e., plastic from which the water-absorbent polymer and the fluff pulp have been separated) is used as the material for the granular core portion 72. The granular core portion 72 may be composed only of plastic or may be composed so as to also contain a material other than plastic.

The granular core portion 72 is coated with the coating layer portion 74. The entire surface of the granular core portion 72 may be coated with the coating layer portion 74, or only a portion of the surface of the granular core portion 72 may be coated with the coating layer portion 74. The coating layer portion 74 has the function of causing members of the water absorption material 70 that have absorbed a liquid such as urine to adhere to each other and to form clumps. For example, paper powder and a water-absorbent polymer can be used as the materials (coating material) for the coating layer portion 74.

Next, an example of a method for manufacturing the water absorption material 70 will be described as an embodiment of the method for manufacturing a water absorption material according to the present invention. This manufacturing method includes a separation step, a granulation step, a coating step, a sizing step, and a drying step. In the separation step, the plastic and the water-absorbent polymer contained in the disposable diaper are separated using the separation device 1.

In the granulation step, a material to be granulated containing the plastic obtained in the separation step is granulated. For example, an extrusion granulator can be used for granulation. At this time, water may be added to the material to be granulated prior to granulation, if necessary. Thus, the granular core portion 72 is obtained.

In the coating step, a coating material is deposited on the surface of the granular core portion 72 formed in the granulation step. Preferably, the coating material contains the water-absorbent polymer obtained in the separation step. The deposition of the coating material can be performed through sprinkling or spraying using a coater, for example. Thus, the coating layer portion 74 is obtained.

In the sizing step, the water absorption material manufactured through the prior steps is caused to pass through a sieve having a predetermined mesh size. Thus, only a portion of the water absorption material that satisfies a predetermined standard is extracted.

In the drying step, the water absorption material extracted in the previous step is dried in a dryer. The percentage of moisture content in the granular core portion 72 is adjusted as appropriate through drying. Thus, the transition of the moisture content in the granular core portion 72 to the coating layer portion 74 and a resultant decrease in water absorption capacity can be prevented, and also the occurrence of mold and the like during storage of the water absorption material 70 can be prevented.

Effects of the present embodiment will be described below. According to the present embodiment, beating by the beating unit 20 is performed prior to separation by the separation unit 30. The beating promotes the dissociation of the water-absorbent polymer from the plastic. That is to say, beating by the beating unit 20 dissociates a portion of the water-absorbent polymer from the plastic, and thus reduces the amount of water-absorbent polymer adhering to the plastic. This contributes to a reduction in the processing load on the separation unit 30. Furthermore, the other portion of the water-absorbent polymer that has not been dissociated from the plastic in the beating unit 20 is also in an easy-to-dissociate state, because the adhesion to the plastic is reduced due to the hitting force and the like generated by the beating. Thus, in the separation unit 30, the water-absorbent polymer is easily separated from the disposable diaper fragments, and therefore the separation efficiency is improved.

The separation device 1 having excellent separation efficiency as described above is particularly useful in cases where the processing target is a hygiene product such as a disposable diaper as in the present embodiment. The reason for this is that, in such a hygiene product, which has a structure in which a particulate water-absorbent polymer adheres to a sheet-like plastic, it is difficult to separate the water-absorbent polymer, and as such a sufficient separation efficiency has not been achieved by conventional separation devices.

With regard to the beating unit 20, the beating members 22 are attached to the circumference of the rotational shaft 24. With this configuration, the beating members 22 can be rotated together with the rotational shaft 24. Thus, beating of the disposable diaper fragments with the beating members 22 can be efficiently performed.

The plurality of beating members 22 radially attached to the circumference of the rotational shaft 24 are provided in the beating unit 20. Thus, while the rotational shaft 24 makes one rotation, the disposable diaper fragments are beaten with the plurality of beating members 22, and thus beating of the disposable diaper fragments by the beating members 22 can be performed even more efficiently.

The beating members 22 each have a plate-like shape and are configured to beat the disposable diaper fragments with their plate surfaces. A strong hitting force can be applied to the disposable diaper fragments by beating the disposable diaper with the plate surfaces of the beating members 22 in this manner.

In the beating unit 20, the housing 26 is provided so as to enclose the beating members 22 and the rotational shaft 24. Therefore, a portion of the disposable diaper fragments beaten by the beating members 22 is rubbed against the inner circumferential surface of the housing 26. Thus, in the beating unit 20, not only the hitting force that acts on the disposable diaper fragments during beating by the beating members 22, but also a frictional force that acts on the disposable diaper fragments while they are being rubbed against the inner circumferential surface of the housing 26 contributes to the dissociation of the water-absorbent polymer from the plastic. Moreover, a portion of the disposable diaper fragments is flung by the beating members 22 and strikes the inner circumferential surface and the like of the housing 26. The impact force that acts on the disposable diaper fragments at this time also contributes to the dissociation of the water-absorbent polymer from the plastic.

With regard to the separation unit 30, the drum 32 is provided with the ridges 34. If the ridges 34 are not provided, the disposable diaper fragments tend to collect in a lower portion of the drum 32 due to the effect of gravity. In contrast, in the present embodiment, the disposable diaper fragments in the drum 32 are scooped up by the ridges 34 and thus easily reach an upper portion of the drum 32. This scooping effect allows the disposable diaper fragments to be distributed over a wide range of the inner circumferential surface of the drum 32, so that separation by the separation unit 30 is promoted. Moreover, dissociation of the water-absorbent polymer from the plastic is promoted by the impact of the disposable diaper fragments when falling down from the upper portion of the drum 32. Furthermore, the ridges 34 become obstacles when the disposable diaper fragments are propelled by the screw member 38, and thus the time for which the disposable diaper fragments stay in the drum 32 is prolonged. Thus, a larger amount of water-absorbent polymer can be separated from the disposable diaper fragments.

The screw member 38 is provided inside the drum 32. When propelled by the screw member 38, a portion of the disposable diaper fragments in the drum 32 is rubbed against the inner circumferential surface of the drum 32 by the screw member 38. The frictional force at this time also promotes the dissociation of the water-absorbent polymer from the plastic. Moreover, since the ridges 34 are provided, the disposable diaper fragments may be rubbed against the inner circumferential surface of the drum 32 in a state in which the disposable diaper fragments are caught on the ridges 34. In that case, forces are focused, so that the frictional force that is applied to the disposable diaper fragments increases, and accordingly dissociation of the water-absorbent polymer from the plastic is promoted even more.

The screw member 38 rotates with the side 39b that forms an obtuse angle with the rotation direction (direction of the tangent to the rotating rod 36), rather than the side 39a that forms an approximately right angle with the rotation direction, being located on the forward side (see FIG. 5). Thus, the disposable diaper fragments can be prevented from being excessively caught on the teeth 39 of the screw member 38.

According to the present embodiment, after shredding by the shredding unit 10, beating by the beating unit 20, and separation by the separation unit 30 have been performed, shredding by the shredding unit 40, beating by the beating unit 50, and separation by the separation unit 60 are performed. Since shredding, beating, and separation are performed twice in this manner, the separation efficiency is improved even more.

With regard to the beating unit 50, the beating members 52 are attached to the circumference of the rotational shaft 54. With this configuration, the beating members 52 can be rotated together with the rotational shaft 54. Thus, beating of the disposable diaper fragments by the beating members 52 can be efficiently performed.

The plurality of beating members 52 radially attached to the circumference of the rotational shaft 54 are provided in the beating unit 50. Thus, while the rotational shaft 54 makes one rotation, the disposable diaper fragments are beaten with the plurality of beating members 52, and thus beating of the disposable diaper fragments by the beating members 52 can be performed even more efficiently.

The beating members 52 each have a plate-like shape and are configured to beat the disposable diaper fragments with their plate surfaces. A strong hitting force can be applied to the disposable diaper fragments by beating the disposable diaper fragments with the plate surfaces of the beating members 52 in this manner.

In the beating unit 50, the housing 56 is provided so as to enclose the beating members 52 and the rotational shaft 54. Therefore, a portion of the disposable diaper fragments beaten by the beating members 52 is rubbed against the inner circumferential surface of the housing 56. Thus, in the beating unit 50, not only the hitting force that acts on the disposable diaper fragments during beating by the beating members 22, but also a frictional force that acts on the disposable diaper fragments while they are being rubbed against the inner circumferential surface of the housing 56 contributes to the dissociation of the water-absorbent polymer from the plastic. Moreover, a portion of the disposable diaper fragments is flung by the beating members 52 and strikes the inner circumferential surface and the like of the housing 56. The impact force that acts on the disposable diaper fragments at this time also contributes to the dissociation of the water-absorbent polymer from the plastic.

The distance from the inner circumferential surface of the housing 56 to the leading end of each beating member 52 is smaller than the distance from the inner circumferential surface of the housing 26 to the leading end of each beating member 22. That is to say, in the beating unit 20, in which relatively large disposable diaper fragments are processed, the distance between the housing 26 and each beating member 22 is relatively large, whereas in the beating unit 50, in which relatively small disposable diaper fragments are processed, the distance between the housing 56 and each beating member 52 is relatively small. Setting the above-described distances in accordance with the size of the processing target in this manner makes it possible to apply an appropriate frictional force to the processing target in either beating unit. However, it is not absolutely necessary to set the distance from the inner circumferential surface of the housing 56 to the leading end of each beating member 52 to be smaller than the distance from the inner circumferential surface of the housing 26 to the leading end of each beating member 22.

With regard to the separation unit 60, the drum 62 is provided with the ridges 64. If the ridges 64 are not provided, the disposable diaper fragments tend to collect in a lower portion of the drum 62 due to the effect of gravity. In contrast, in the present embodiment, the disposable diaper fragments in the drum 62 are scooped up by the ridges 64 and thus easily reach an upper portion of the drum 62. This scooping effect allows the disposable diaper fragments to be distributed over a wide range of the inner circumferential surface of the drum 62, so that separation by the separation unit 60 is promoted. Moreover, dissociation of the water-absorbent polymer from the plastic is promoted by the impact of the disposable diaper fragments when falling down from the upper portion of the drum 62. Furthermore, the ridges 64 become obstacles when the disposable diaper fragments are propelled by the screw member 68, and thus the time for which the disposable diaper fragments stay in the drum 62 is prolonged. Thus, a larger amount of water-absorbent polymer can be separated from the disposable diaper fragments.

The height of the ridges 64 is smaller than the height of the ridges 34. That is to say, in the separation unit 30, in which relatively large disposable diaper fragments are processed, the height of the ridges 34 is relatively large, whereas in the separation unit 60, in which relatively small disposable diaper fragments are processed, the height of the ridges 64 is relatively small. Setting the height of the ridges in accordance with the size of the processing target makes it possible to achieve a sufficient effect of the ridges scooping up the processing target in either separation unit. However, it is not absolutely necessary to set the height of the ridges 64 to be smaller than the height of the ridges 34.

The screw member 68 is provided inside the drum 62. When propelled by the screw member 68, a portion of the disposable diaper fragments in the drum 62 is rubbed against the inner circumferential surface of the drum 62 by the screw member 68. The frictional force at this time also promotes the dissociation of the water-absorbent polymer from the plastic. Moreover, since the ridges 64 are provided, the disposable diaper fragments may be rubbed against the inner circumferential surface of the drum 62 in a state in which the disposable diaper fragments are caught on the ridges 64. In that case, forces are focused, so that the frictional force that is applied to the disposable diaper fragments increases, and accordingly dissociation of the water-absorbent polymer from the plastic is promoted even more.

The distance from the outer end of the side 69a to the inner circumferential surface of the drum 62 is smaller than the distance from the outer end of the side 39a to the inner circumferential surface of the drum 32. That is to say, in the separation unit 30, in which relatively large disposable diaper fragments are processed, the distance from the outer end of the side 39a to the inner circumferential surface of the drum 32 is relatively large, whereas in the separation unit 60, in which relatively small disposable diaper fragments are processed, the distance from the outer end of the side 69a to the inner circumferential surface of the drum 62 is relatively small. Setting the above-described distance in accordance with the size of the processing target in this manner makes it possible to apply an appropriate frictional force to the processing target in either separation unit. However, it is not absolutely necessary to set the distance from the outer end of the side 69a to the inner circumferential surface of the drum 62 to be smaller than the distance from the outer end of the side 39a to the inner circumferential surface of the drum 32.

The screw member 68 rotates with the side 69b that forms an obtuse angle with the rotation direction (direction of the tangent to the rotating rod 66), rather than the side 69a that forms an approximately right angle with the rotation direction, being located on the forward side (see FIG. 9). Thus, the disposable diaper fragments can be prevented from being excessively caught on the teeth 69 of the screw member 68.

In the water absorption material 70, the plastic obtained in the separation step is used as the material for the granular core portion 72. Thus, the cost of procuring the plastic can be reduced by effectively using defective or discarded disposable diapers. Moreover, in the separation step, the separation device 1 having excellent separation efficiency as described above is used, and thus, the ratio of impurities (water-absorbent polymer and fluff pulp that have not been separated from disposable diaper fragments) contained in the granular core portion 72 can be reduced to a low level.

In the case where the water-absorbent polymer obtained in the separation step is used as the material for the coating layer portion 74, the cost of procuring the water-absorbent polymer can be reduced by effectively using defective or discarded disposable diapers.

The present invention is not limited to the foregoing embodiments, and various modifications are conceivable. In the foregoing embodiments, an example in which shredding, beating, and separation are performed twice has been described. However, shredding, beating, and separation may also be performed only once or may also be performed three or more times.

It goes without saying that the various numerical values shown in the foregoing embodiments by way of example can be set as appropriate in accordance with] the size and the like of the processing target. For example, in the case where the processing target is a sanitary napkin or a urine absorbing pad, the hole diameter of the screen of the shredding unit 10 can be set between 30 mm and 50 mm inclusive, and the hole diameter of the screen of the shredding unit 40 can be set between 10 mm and 30 mm inclusive.

Figure 11:
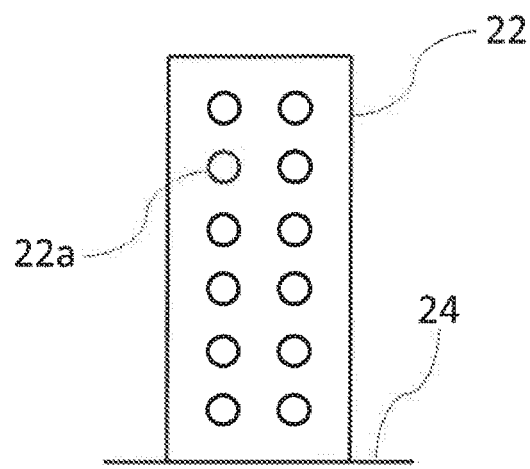
FIG. 11 is a plan view showing a beating member 22 according to a modification.
Figure 12:
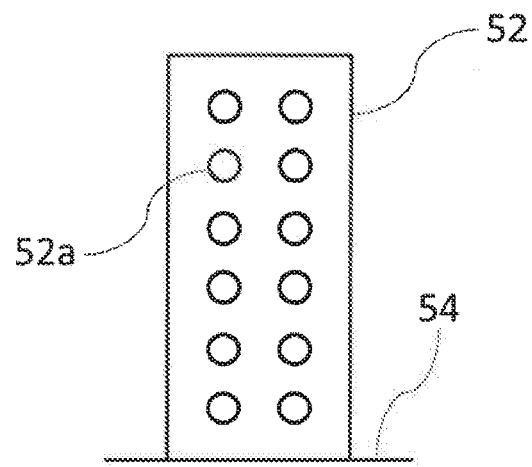
FIG. 12 is a plan view showing a beating member 52 according to a modification.

In the foregoing embodiment, an opening 22a (first opening) may also formed in the plate surface of each beating member 22 as shown in FIG. 11. In this example, a plurality of openings 22a are formed. These openings 22a are provided in order to reduce air resistance while the beating members 22 rotate. That is to say, while the beating members 22 are rotating, air passes through the openings 22a, and therefore, the air resistance acting on the beating members 22 can be reduced. Thus, power consumption of the beating unit 20 can be reduced, and wind pressure exerted on the processing target from the beating members 22 can be reduced to a low level. If high wind pressure is exerted on the processing target, the processing target is moved away from the plate surfaces of the beating members 22 before the processing target is beaten. For this reason, high wind pressure may constitute a factor that attenuates the hitting force of the beating members 22. Therefore, reducing the above-described wind pressure to a low level is preferable in exerting a strong hitting force on the processing target. It should be noted that the openings 22a may also be formed by forming substantially the whole or a part of each beating member 22 in a mesh form. That is to say, in this case, the meshes of each beating member 22 correspond to the openings 22a. A similar opening 52a (second opening) may also be formed in the plate surface of each beating member 52 as shown in FIG. 12.

Figure 13:
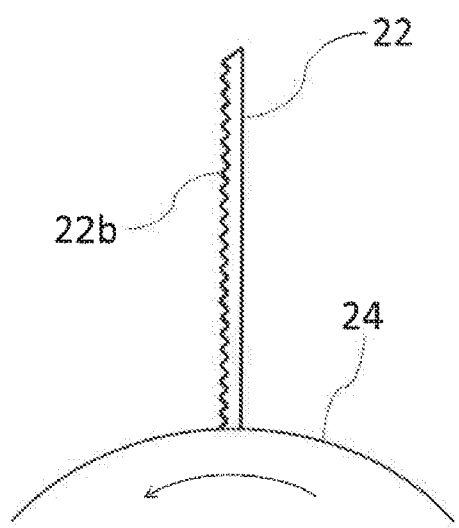
FIG. 13 is a side view showing the beating member 22 according to another modification.
Figure 14:
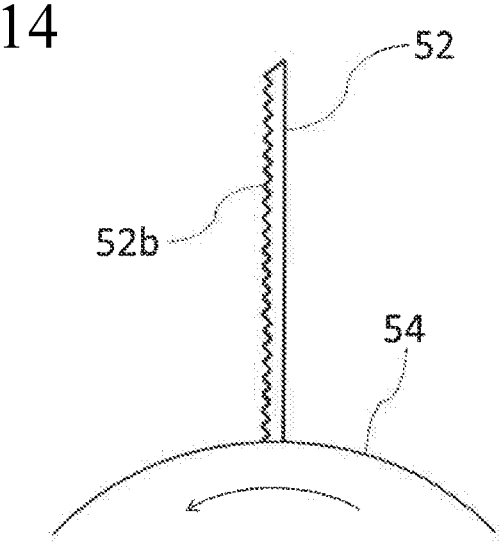
FIG. 14 is a side view showing the beating member 52 according to another modification.

In the foregoing embodiment, protrusions and depressions may also be formed on the plate surface of each beating member 22 as shown in FIG. 13. That is to say, the plate surfaces (surfaces with which the processing target is beaten) of the beating members 22 are uneven surfaces 22b. As indicated by the arrow in this diagram, the beating members 22 and the rotational shaft 24 rotate in the left-handed direction (counterclockwise). Beating the processing target with these uneven surfaces 22b makes it possible to exert a stronger impact on the processing target than in the case where the processing target is beaten with flat surfaces. Similar protrusions and depressions (uneven surface 52b) may also be formed in the plate surface of each beating member 52 as shown in FIG. 14.

In the foregoing embodiment, an example in which the drum 32 has a cylindrical tubular shape has been described. However, it is also possible that the drum 32 has a tapered shape. The same applies to the drum 62.

In the foregoing embodiment, an example in which the central axis of the drum 32 extends horizontally has been described. However, it is also possible that the central axis of the drum 32 is sloped downward from the inlet side toward the outlet side. The same applies to the drum 62.

In the foregoing embodiment, an example in which the holes 32a are formed over substantially the entire drum 32 has been described. However, it is also possible that the holes 32a are formed in only a portion of the drum 32. Moreover, it is also possible that the holes 32a are formed by forming substantially the whole or a portion of the drum 32 in a mesh form. That is to say, in this case, the meshes of the drum 32 correspond to the holes 32a. The same applies to the holes 62a.

In the foregoing embodiment, an example in which the ridges 34 extend over the entire path from the inlet side to the outlet side of the drum 32 has been described. However, it is also possible that the ridges 34 extend in only a portion of the path from the inlet side to the outlet side of the drum 32. The same applies to the ridges 64.

Figure 15:
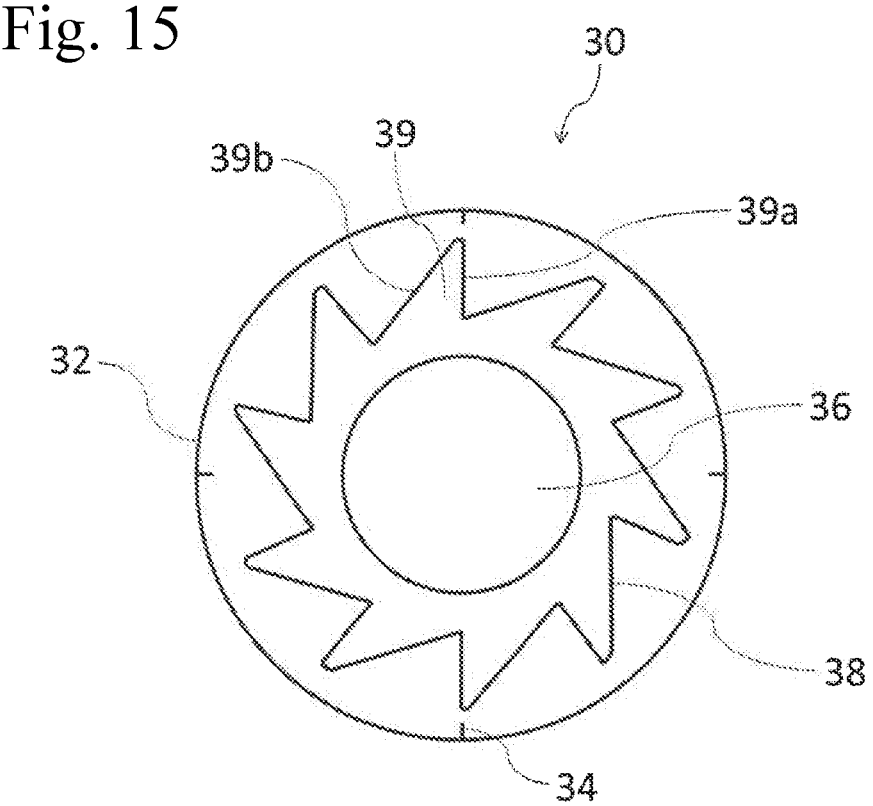
FIG. 15 is a diagram for explaining a modification of ridges 34 shown in FIG. 5.

In the foregoing embodiment, the ridges 34 having a substantially triangular cross-sectional shape have been described as an example. However, it is also possible that the ridges 34 have a flat plate-like shape as shown in FIG. 15. The same applies to the ridges 64.

In the foregoing embodiment, an example in which four ridges 34 are provided on the inner circumferential surface of the drum 32 has been described. However, the number of ridges 34 can be set at any number greater than or equal to 1. The same applies to the ridges 64.

In the foregoing embodiment, an example in which the ridges 34 are provided on the inner circumferential surface of the drum 32 has been described. However, the provision of the ridges 34 is not necessarily required. The same applies to the ridges 64.

In the foregoing embodiment, an example in which the rotating rod 36 and the screw member 38 are provided inside the drum 32 has been described. However, the provision of the rotating rod 36 and the screw member 38 is not necessarily required. The same applies to the rotating rod 66 and the screw member 68.

In the foregoing embodiment, the water absorption material 70 having a multi-layer structure composed of the granular core portion 72 and the coating layer portion 74 has been described as an example. However, the provision of the coating layer portion 74 is not necessarily required. That is to say, the water absorption material 70 may also have a single layer structure composed only of the granular core portion 72.

LIST OF REFERENCE NUMERALS

- 1 Separation device
- 10 Shredding unit (first shredding unit)
- 20 Beating unit (first beating unit)
- 22 Beating member (first beating member)
- 22a Opening (first opening)
- 22b Uneven surface
- 24 Rotational shaft (first rotational shaft)
- 26 Housing (first housing)
- 30 Separation unit (first separation unit)
- 32 Drum (first tubular portion)
- 32a Hole (first hole)
- 34 Ridge (first ridge)
- 36 Rotating rod
- 38 Screw member
- 39 Tooth
- 40 Shredding unit (second shredding unit)
- 50 Beating unit (second beating unit)
- 52 Beating member (second beating member)
- 52a Opening (second opening)
- 52b Uneven surface
- 54 Rotational shaft (second rotational shaft)
- 56 Housing (second housing)
- 60 Separation unit (second separation unit)
- 62 Drum (second tubular portion)
- 62a Hole (second hole)
- 64 Ridge (second ridge)
- 66 Rotating rod
- 68 Screw member
- 69 Tooth
- 70 Water absorption material
- 72 Granular core portion (granulated matter)
- 74 Coating layer portion

The invention claimed is:

1. A separation device comprising:
   a first shredding unit that shreds a processing target containing a first material and a second material adhering to the first material;
   a first beating unit that has a first beating member with which the processing target shredded by the first shredding unit is beaten, and that promotes dissociation of the second material from the first material by beating the processing target with the first beating member;
   a first separation unit that has a first tubular portion in which plurality of first holes that allow the second material contained in the processing target beaten by the first beating unit to pass through without allowing the first material to pass through are formed, and that separates the second material passing through the first holes from the processing target by rotating the first tubular portion in a state in which the processing target beaten by the first beating unit is accommodated in the first tubular portion;
   a second shredding unit that shreds the processing target from which the second material passing through the first holes has been separated by the first separation unit;
   a second beating unit that has a second beating member with which the processing target shredded by the second shredding unit is beaten, and that promotes dissociation of the second material from the first material by beating the processing target with the second beating member; and
   a second separation unit that has a second tubular portion in which a plurality of second holes that allow the second material contained in the processing target beaten by the second beating unit to pass through without allowing the first material to pass through are formed, and that separates the second material passing through the second holes from the processing target by rotating the second tubular portion in a state in which the processing target beaten by the second beating unit is accommodated in the second tubular portion,
   wherein:
   the first beating unit has a first rotational shaft,
   the first beating member is attached to a circumference of the first rotational shaft,
   the first beating unit has a first housing that is provided so as to enclose the first beating member and the first rotational shaft and that is configured to accommodate the processing target shredded by the first shredding unit,
   the second beating unit has a second rotational shaft,
   the second beating member is attached to a circumference of the second rotational shaft,
   the second beating unit has a second housing that is provided so as to enclose the second beating member and the second rotational shaft and that is configured to accommodate the processing target shredded by the second shredding unit, and
   a distance from an inner circumferential surface of the second housing to a leading end of the second beating member is smaller than a distance from an inner circumferential surface of the first housing to a leading end of the first beating member.

2. The separation device according to claim 1, wherein the first beating unit has a plurality of said first beating members, and the plurality of first beating members are radially attached to the circumference of the first rotational shaft.

3. The separation device according to claim 1, wherein the first beating member has a plate shape and beats the processing target with a plate surface thereof.

4. The separation device according to claim 3, wherein a first opening is formed in the plate surface of the first beating member.

5. The separation device according to claim 3, wherein protrusions and depressions are formed in the plate surface of the first beating member.

6. The separation device according to claim 1, wherein the first separation unit has a first ridge that is provided on an inner circumferential surface of the first tubular portion and that extends in a direction in which a central axis of the first tubular portion extends.

7. The separation device according to claim 1, wherein the second beating unit has a plurality of said second beating members, and the plurality of second beating members are radially attached to the circumference of the second rotational shaft.

8. The separation device according to claim 1, wherein the second beating member has a plate shape and beats the processing target with a plate surface thereof.

9. The separation device according to claim 1, wherein an area of the second holes in a plan view is smaller than an area of the first holes in a plan view.

10. The separation device according to claim 1,
wherein the first material is a plastic, and
the second material is a water-absorbent polymer.

11. The separation device according to claim 1,
wherein the processing target is a hygiene product.

12. The separation device according to claim 11,
wherein the processing target is a disposable diaper.

13. A method for manufacturing a water absorption material that absorbs a liquid, the method comprising:
- a preparation step of preparing the separation device according to claim 1;
- a separation step of separating the first material and the second material using the separation device; and
- a granulation step of granulating a material to be granulated containing the first material obtained in the separation step, wherein the separation step includes:
- a first shredding of shredding the processing target with the first shredding unit;
- a first beating of beating the processing target shredded in the first shredding with the first beating member in a state in which the processing target is accommodated in the first housing;
- a first separating of separating the second material passing through the first holes from the processing target by rotating the first tubular portion in a state in which the processing target beaten in the first beating is accommodated in the first tubular portion;
- a second shredding of shredding the processing target from which the second material passing through the first holes has been separated in the first separating with the second shredding unit;
- a second beating of beating the processing target shredded in the second shredding with the second beating member in a state in which the processing target is accommodated in the second housing, and
- a second separating of separating the second material passing through the second holes from the processing target by rotating the second tubular portion in a state in which the processing target beaten in the second beating is accommodated in the second tubular portion.

14. The method for manufacturing a water absorption material according to claim 13, the method further comprising:
- a coating step of depositing a coating material on a surface of a granulated matter formed in the granulation step, thereby forming a coating layer portion with which the granulated matter is coated.

15. The method for manufacturing a water absorption material according to claim 14,
wherein the coating material contains the second material obtained in the separation step.

* * * * *